US012269272B2

(12) United States Patent
Tomie et al.

(10) Patent No.: US 12,269,272 B2
(45) Date of Patent: Apr. 8, 2025

(54) LIQUID DISCHARGE APPARATUS AND LIQUID STORAGE CONTAINER

(71) Applicant: CANON KABUSHIKI KAISHA, Tokyo (JP)

(72) Inventors: Mineyoshi Tomie, Saitama (JP); Hideaki Matsumura, Tokyo (JP); Yuri Mori, Tokyo (JP); Ken Takenaga, Kanagawa (JP); Daiju Takeda, Kanagawa (JP); Koki Shimada, Kanagawa (JP); Tsuyoshi Saeki, Kanagawa (JP); Shota Asada, Tokyo (JP); Hiromasa Tsutsumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 18/064,145

(22) Filed: Dec. 9, 2022

(65) Prior Publication Data

US 2023/0182476 A1 Jun. 15, 2023

(30) Foreign Application Priority Data

Dec. 10, 2021 (JP) ................................ 2021-201109

(51) Int. Cl.
*B41J 2/175* (2006.01)
*B41J 29/13* (2006.01)
*B41J 2/135* (2006.01)

(52) U.S. Cl.
CPC ....... *B41J 2/17553* (2013.01); *B41J 2/17509* (2013.01); *B41J 2/17513* (2013.01)

(58) Field of Classification Search
CPC ...... B41J 2/1714; B41J 2/1721; B41J 2/1742; B41J 2/17509; B41J 2/17553; B41J 2/17503
See application file for complete search history.

(56) References Cited

U.S. PATENT DOCUMENTS 5,988,792 A * 11/1999 Okazaki ............... B41J 2/16538 347/44
2021/0001634 A1 * 1/2021 Lee ...................... B41J 2/17553

FOREIGN PATENT DOCUMENTS

JP 2015020347 A * 2/2015 .............. B41J 2/175
JP 6102596 B2 3/2017

* cited by examiner

*Primary Examiner* — Leslie J Evanisko
*Assistant Examiner* — Thomas Ray Knief
(74) *Attorney, Agent, or Firm* — Canon U.S.A., Inc. I.P. Division

(57) ABSTRACT

A liquid discharge apparatus includes a liquid discharge head to discharge liquid to a medium and a liquid storage container. The liquid storage container includes a reservoir portion, a liquid injection portion, a liquid holding unit, and a liquid guide portion. The reservoir portion reserves the liquid that is supplied to the liquid discharge head. The liquid injection portion allows a liquid injection container for injecting the liquid into the reservoir portion to be inserted in the liquid injection portion in a first direction. The liquid holding unit is provided at a position spaced apart from the liquid injection portion and is capable of holding the liquid. The liquid guide portion guides the liquid from the liquid injection portion to the liquid holding unit in a second direction intersecting with the first direction.

11 Claims, 14 Drawing Sheets

LIQUID DISCHARGE APPARATUS AND LIQUID STORAGE CONTAINER

BACKGROUND

Field

The present disclosure relates to a liquid discharge apparatus that carries out recording by discharging liquid onto a recording medium and a liquid storage container that contains the liquid.

Description of the Related Art

Inkjet-type liquid discharge apparatuses have been known as liquid discharge apparatuses including a storage container that contains ink to discharge from a recording head. Some of storage containers provided to such liquid discharge apparatuses have an injection port for injecting the ink, and a user can inject the ink from the injection port into the storage container. Japanese Patent No. H6102596 discusses a configuration that allows ink attached in the vicinity of an ink injection portion to be moved from an opening to an ink reception portion provided in the vicinity of the ink injection portion.

However, in the configuration discussed in Japanese Patent No. H6102596, if the ink is attached so as to be scattered in the vicinity of the ink injection portion, the ink may fail to head from the opening to the ink reception portion and remain spread in the vicinity of the ink injection portion.

SUMMARY

The present disclosure is directed to preventing liquid from spreading to the vicinity of a liquid storage container.

According to an aspect of the present disclosure, a liquid discharge apparatus includes a liquid discharge head configured to discharge liquid to a medium, and a liquid storage container including a reservoir portion configured to reserve the liquid that is supplied to the liquid discharge head, a liquid injection portion configured to allow a liquid injection container for injecting the liquid into the reservoir portion to be inserted in the liquid injection portion in a first direction, a liquid holding unit provided at a position spaced apart from the liquid injection portion and capable of holding the liquid, and a liquid guide portion configured to guide the liquid from the liquid injection portion to the liquid holding unit in a second direction intersecting with the first direction.

Further features of the present disclosure will become apparent from the following description of exemplary embodiments with reference to the attached drawings.

DESCRIPTION OF THE EMBODIMENTS

Figure 1:
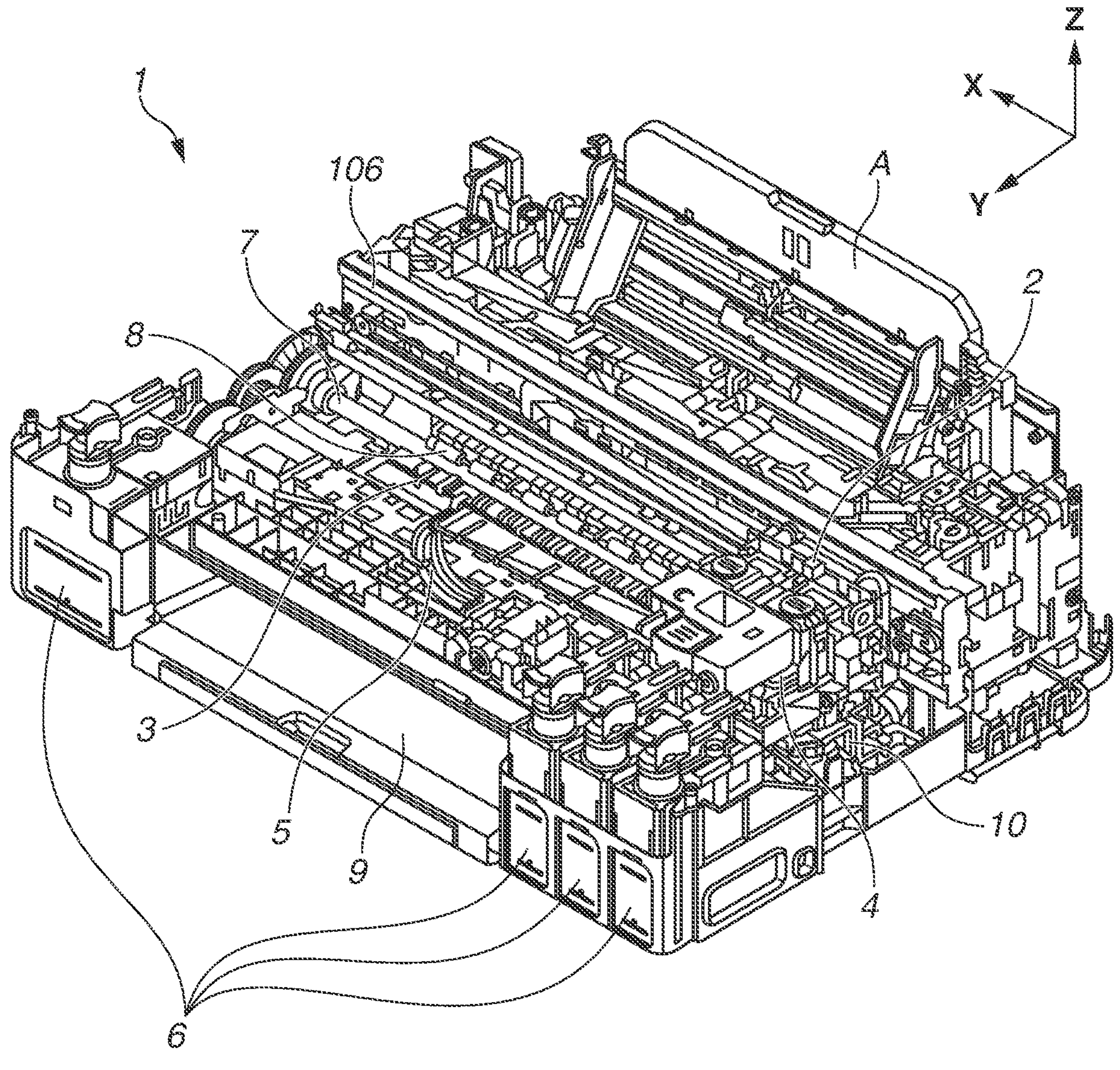
FIG. 1 illustrates the configuration of a liquid discharge apparatus according to a first exemplary embodiment.

First, an inkjet recording apparatus as an example of a liquid discharge apparatus according to an exemplary embodiment of the present disclosure will be schematically described. FIG. 1 is a schematic view of the inkjet recording apparatus according to the present exemplary embodiment.

An inkjet recording apparatus 1 (hereinafter referred to a recording apparatus 1) includes a sheet feeding roller (not illustrated), and a recording medium stacked on a sheet feeding tray A is fed one by one by the sheet feeding roller. The fed recording material is transmitted into between a conveyance roller 7 and a pinch roller 8, and is conveyed in a +Y direction illustrated in FIG. 1. The back surface of the conveyed recording medium is supported by a platen 3, and the distance between a nozzle (not illustrated) on a recording head 4, which is a liquid discharge head, and the recording medium, which is a liquid discharge target medium, is maintained so as to be kept constant or at a predetermined distance. Recording on the recording medium is carried out by discharging ink, which is liquid containing a color material, from the nozzle of the recording head 4 onto the recording medium in this state.

The recording head 4 includes the nozzle that discharges the ink, which is the liquid, and is mounted on a carriage 2. The carriage 2 reciprocates in an X direction on a carriage rail 106 by a driving unit such as a motor. The recording head 4 discharges an ink droplet while moving in a main scanning direction together with the carriage 2, thereby recording an image corresponding to one band onto the recording medium on the platen 3. After the image corresponding to one band is recorded, the recording medium is conveyed in a conveyance direction by a predetermined amount by the conveyance roller 7 (an intermittent conveyance operation). An image is recorded onto the recording medium based on image data by repeating these recording operation corresponding to one band and intermittent conveyance operation. The recording medium on which the recording by the recording head 4 is completed is transmitted into between a sheet discharge roller (not illustrated) and a spur roller (not illustrated), and is discharged onto a sheet discharge tray 9.

Further, the recording apparatus 1 is equipped with ink tanks 6, which are a plurality of independent liquid storage containers each corresponding to the color of the ink discharged from the recording head 4. The ink tanks 6 and the recording head 4 are connected to each other via a joint (not illustrated) using tubes 5 (refer to FIGS. 3A and 3B) corresponding to the respective ink colors. This allows the ink of the color contained in each of the ink tanks 6 to be individually separately supplied to the nozzle of the recording head 4 corresponding to each of the ink colors.

The recording apparatus 1 includes a cap unit 10 that covers the surface where the nozzle of the recording head 4 is formed. The cap unit 10 is made from a flexible material, and is configured movably to a capping position, at which the cap unit 10 covers a face of the recording head 4 on which the nozzle is formed, and a separation position, at which the cap unit 10 does not cover the face of the recording head 4 on which the nozzle is formed. The cap unit 10 is connected to a pump (not illustrated), and a negative pressure is generated inside the cap unit 10 and the ink is sucked from the recording head 4 when the pump is driven with the cap unit 10 located at the capping position. By this operation, the ink discharge performance of the recording head 4 is recovered. Further, the cap unit 10 also fulfills a role of reducing the time during which the nozzle of the recording head 4 is exposed to the atmosphere to thus reduce a failure in the discharge of the ink due to the dried nozzle by placing the cap unit 10 at the capping position in a waiting state where the recording head 4 does not perform a recording operation.

Figure 2:
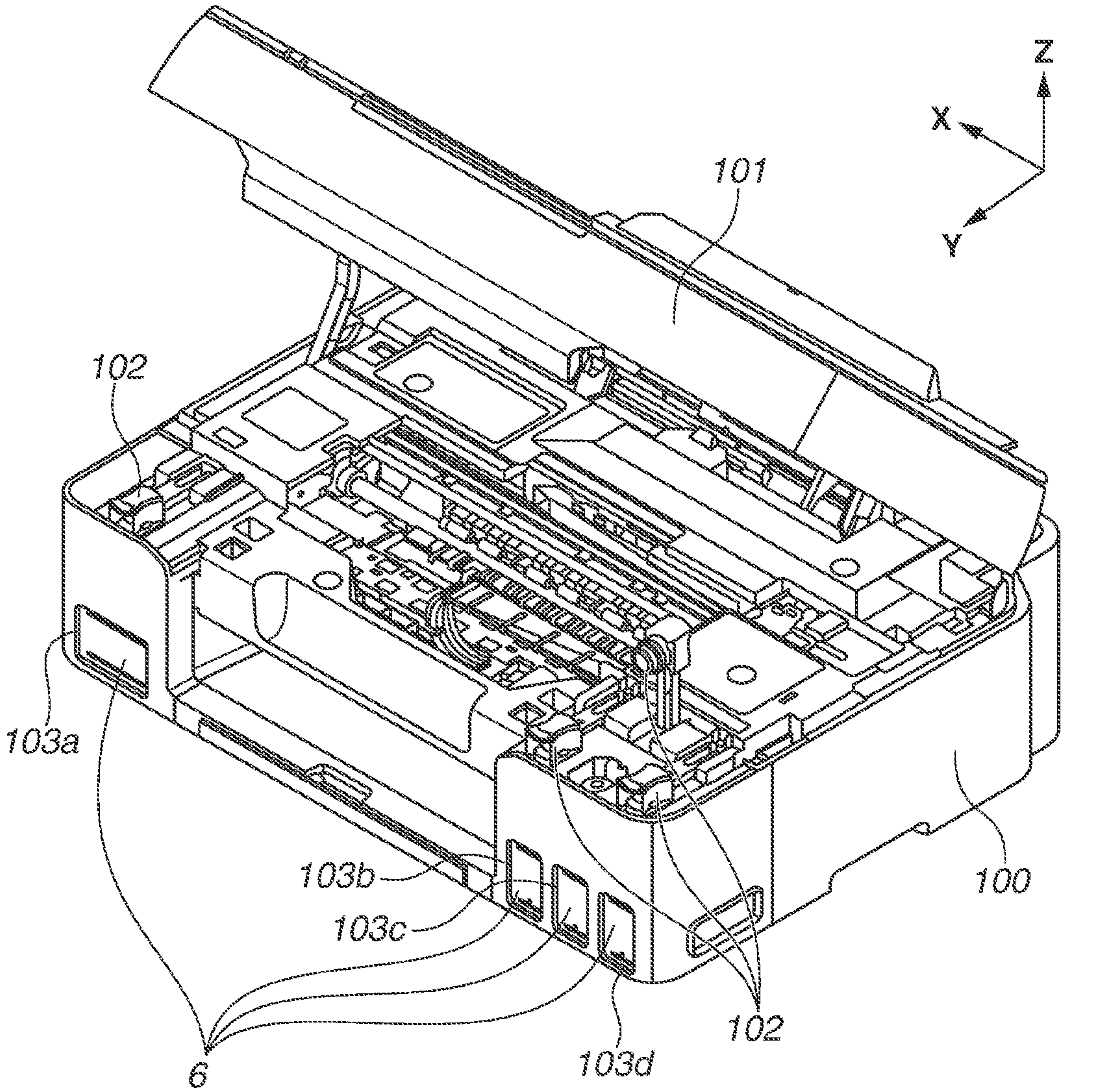
FIG. 2 illustrates the configuration including a housing of the liquid discharge apparatus according to the first exemplary embodiment.

The recording apparatus 1 is covered by a housing 100 as illustrated in FIG. 2. The housing 100 includes opening windows 103*a*, 103*b*, 103*c*, and 103*d* so as to correspond to the layout positions of the ink tanks 6, and a user can visually confirm the ink tanks 6 from the front direction via the respective opening windows. This allows the user to check the remaining amounts of the inks stored in the ink tanks 6 with his/her eyes. Each of the ink tanks 6 according to the present exemplary embodiment is configured to allow the ink to be injected into it via an ink injection port 17 (refer to FIG. 4), which is a liquid injection portion, and the ink injection port 17 is closed by a plug member 102. The plug member 102 is configured movably to a close position, at which the plug member 102 covers the ink injection port 17, and an open position, at which the plug member 102 opens the ink injection port 17.

A cover 101 is provided to the recording apparatus 1, and the cover 101 is configured pivotally to a close position, at which the cover 101 covers the inside the apparatus 1, and an open position, at which the cover 101 opens inside the apparatus 1. When injecting the ink into the ink tank 6, the user moves the cover 101 and the plug member 102 to the respective open positions, and injects the ink with the ink injection port 17 opened.

Figure 3A:
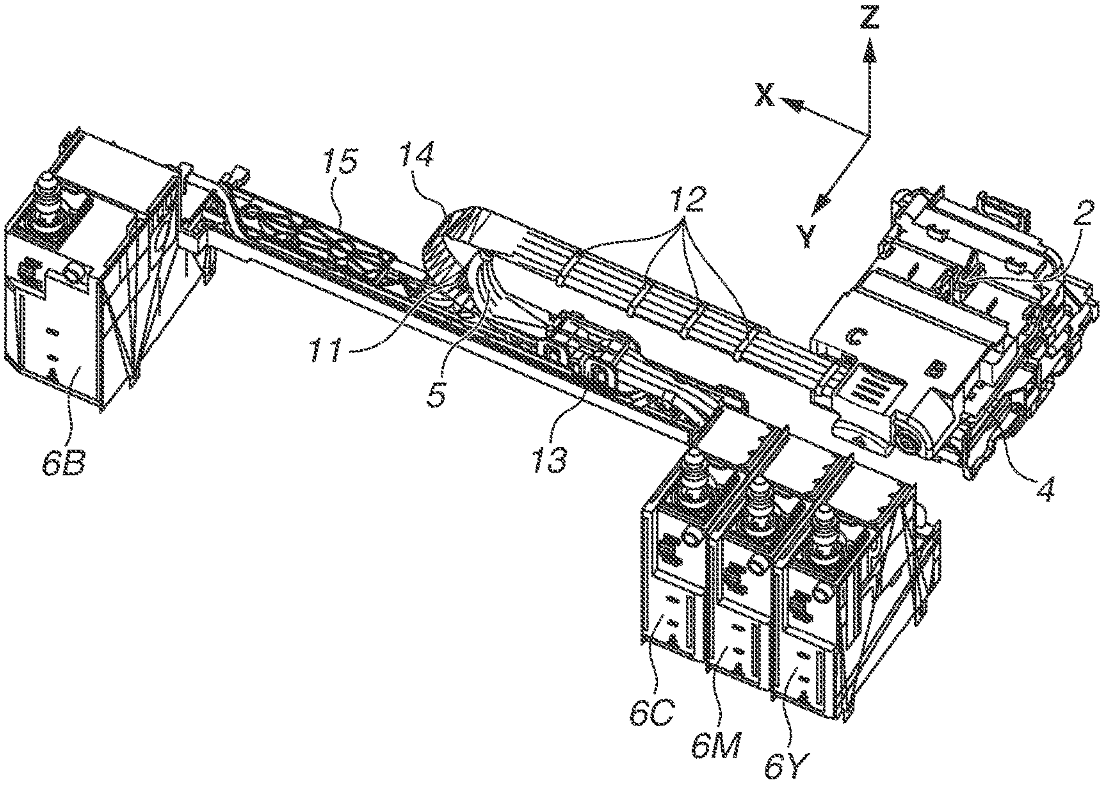
FIGS. 3A and 3B illustrate the configuration of an ink supply unit according to the first exemplary embodiment.
Figure 3B:
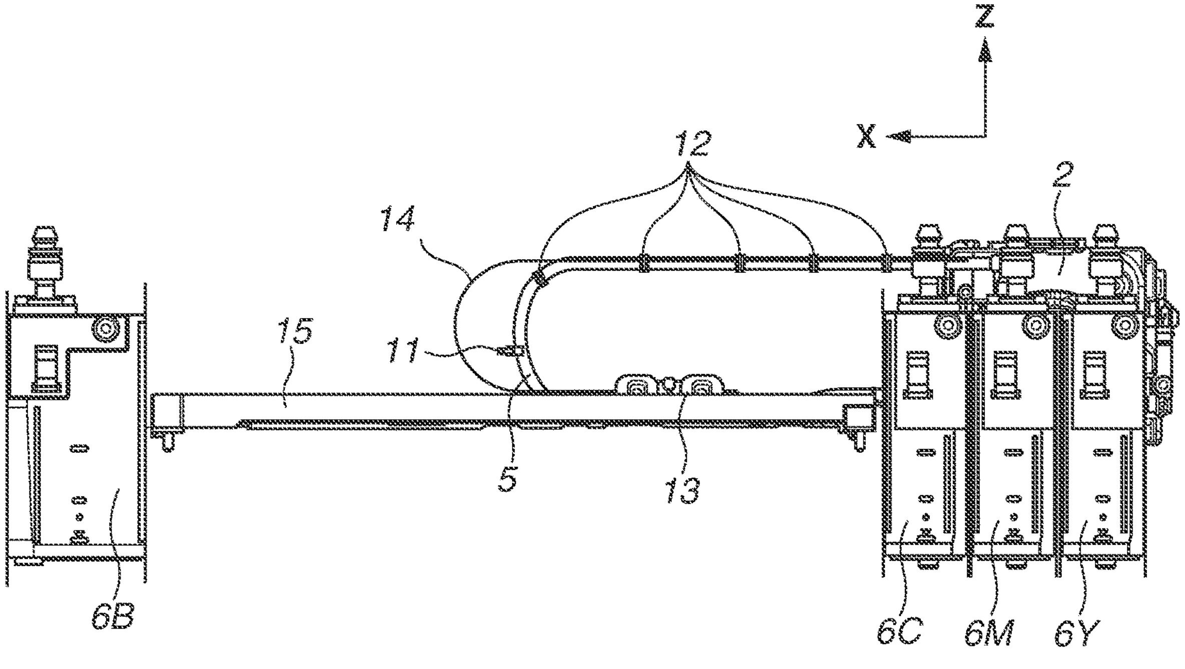

FIGS. 3A and 3B illustrate the configuration of an ink supply unit. FIG. 3A is a perspective view of the ink supply unit, and FIG. 3B is a front view of the ink supply unit viewed from the Y direction. The recording apparatus 1 is equipped with four ink tanks 6B, 6C, 6M and 6Y corresponding to inks of black, cyan, magenta, and yellow colors, respectively, and the inks of these colors are reserved in the respective ink tanks 6. The number of ink tanks 6 and the colors of the inks may be different from the above-described four colors, and the types of the ink colors and the number of ink tanks 6 may be different from four. Further, the recording apparatus 1 may include a plurality of ink tanks 6 in which inks of the same color are reserved. Each of the ink tanks 6 is mounted on the recording apparatus 1 in such an orientation that the ink injection port 17 faces upward.

Each of the ink tanks 6 is connected to the recording head 4 via the tube 5 as described above. The tube 5 extends in the X direction as illustrated in FIGS. 3A and 3B, and is bent halfway to be connected to the recording head 4, and the bent portion of the tube 5 is also moved according to the movement of the recording head 4. A tube guide plate 15 guides the position of the tube 5 when the recording head 4 is moved. Wear of the tube 5 is reduced by providing a tube guide sheet 14 at a portion in abutment with the housing 100 or the tube guide plate 15 when the tube 5 is moved according to the movement of the recording head 4 to thus reduce friction on the tube 5. One end and the other end of the tube guide sheet 14 are fixed to the tube guide plate 15 and the recording head 4, respectively, and the tube guide sheet 14 is configured also movably together with the tube 5 according to the reciprocating movement of the recording head 4.

Further, the plurality of tubes 5 extending from the respective ink tanks 6 is integrally held by a holder slider 11, first tube holders 12, and a second tube holder 13. The abutment of the tube 5 with the above-described tube guide sheet 14 is reduced due to the first tube holders 12.

Further, the second tube holder 13 fulfills a role of fixing the end portion of the tube 5 by sandwiching the tube 5 between the second tube holder 13 and the tube guide plate 15.

Figure 4:
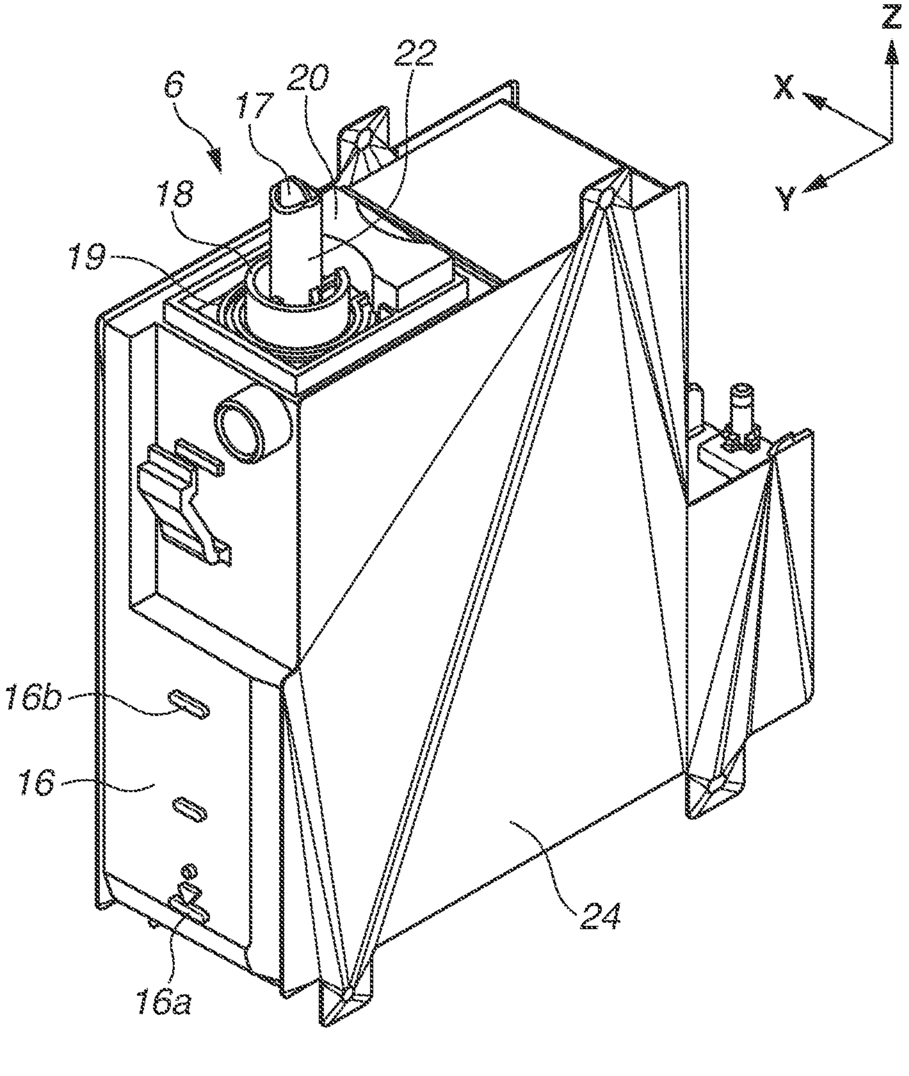
FIG. 4 is a perspective view of an ink tank according to the first exemplary embodiment.

FIG. 4 is a perspective view of the ink tank 6. The ink tank 6 is an integrally molded component having five surfaces, and an ink chamber, which is a reservoir portion configured to reserve the ink, is formed in the ink tank 6 by welding a film 24 to a tank opening portion. The ink tank 6 is made from transparent or translucent resin, and the ink contained in the ink chamber and the liquid surface of the ink can be visually confirmed via a visual confirmation surface 16, and the user can check the ink remaining amount with his/her eyes.

A lower limit scale mark 16*a* and an upper limit scale mark 16*b* are formed in a protruding manner as an example of a scale mark on the visual confirmation surface 16 of the ink tank 6. The lower limit scale mark 16*a* is a scale mark indicating a lower limit amount serving as a sign to inject the ink into the ink chamber. Further, the upper limit scale mark 16*b* is a scale mark indicating an upper limit amount of the ink injected from the ink injection port 17 and contained in the ink chamber. Another scale mark may be provided besides the above-described scale marks 16*a* and 16*b*, or only any one of the scale marks 16*a* and 16*b* may be provided.

Figure 5A:
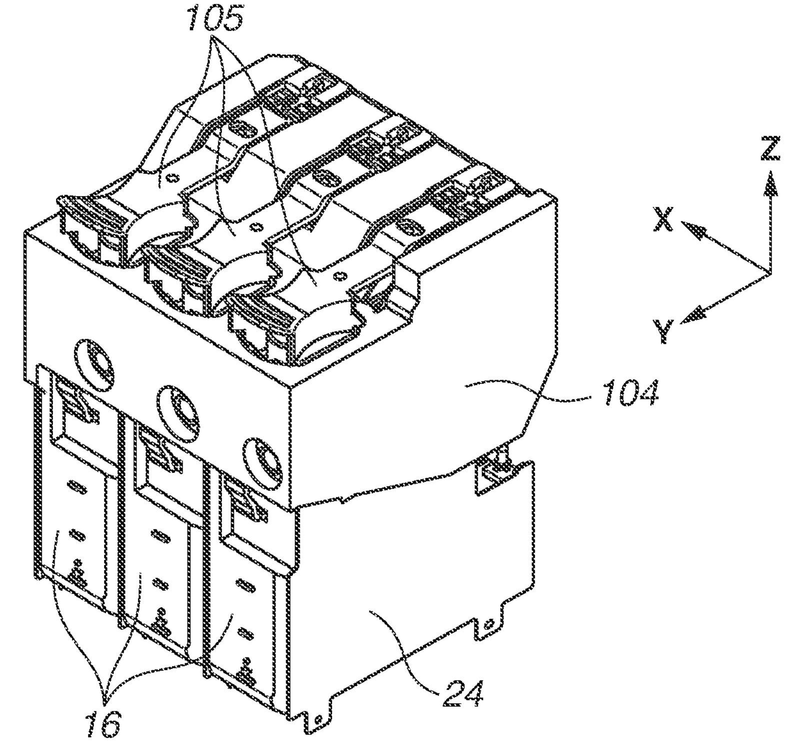
FIGS. 5A and 5B are perspective views when a plug member is opened and closed according to the first exemplary embodiment.
Figure 5B:
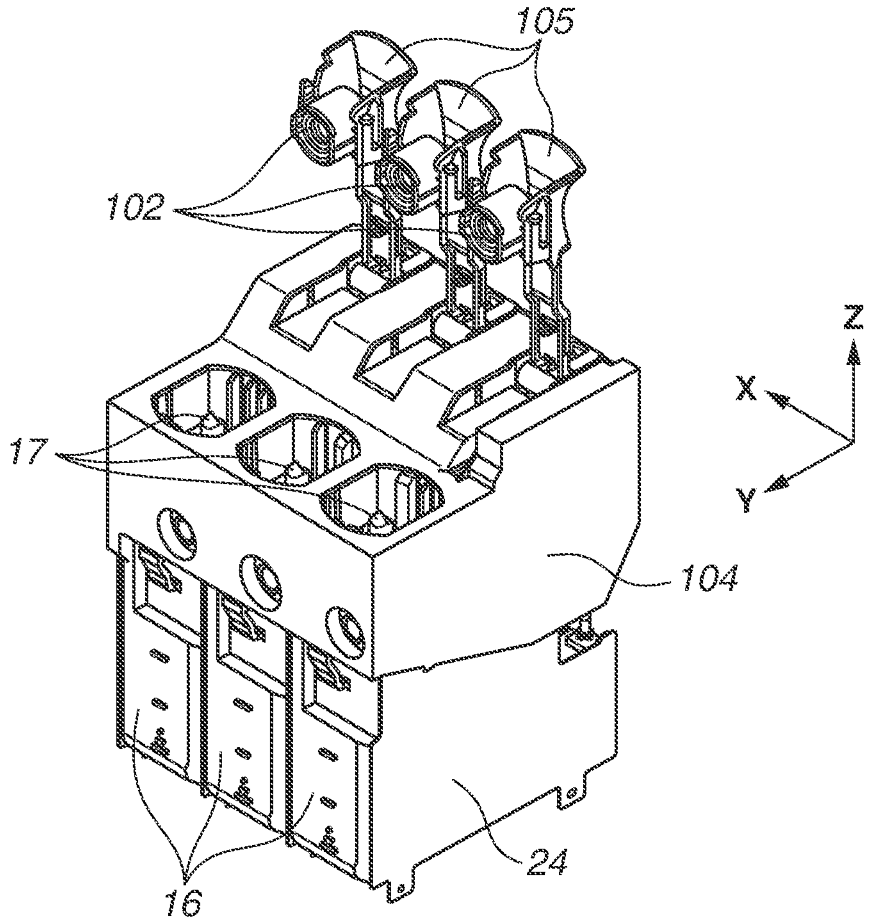
Figure 6A:
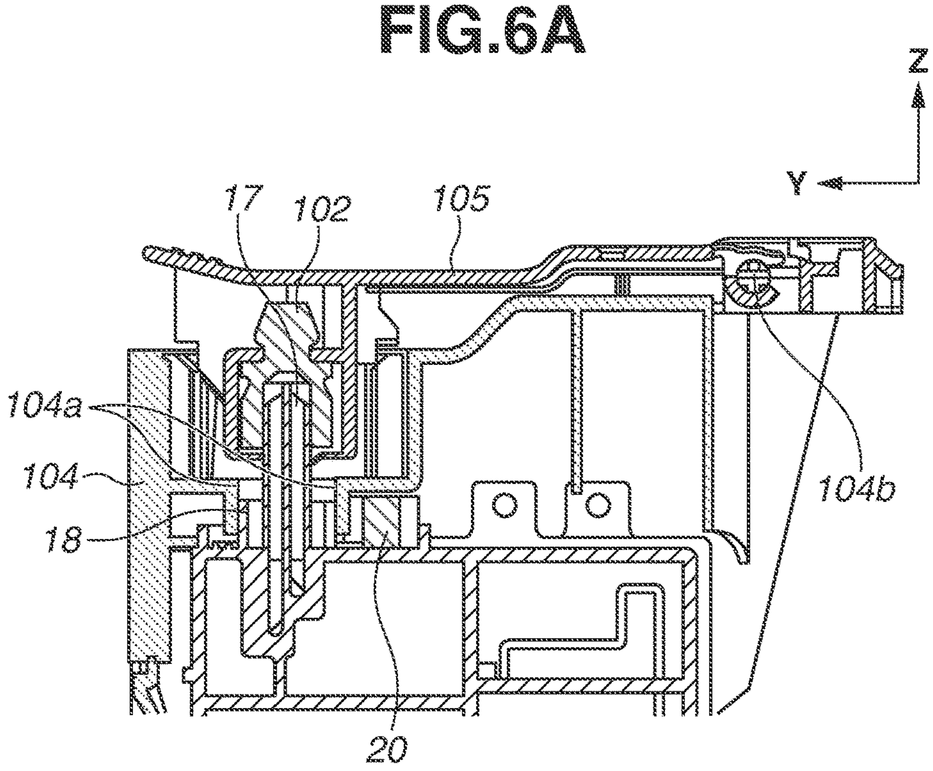
FIGS. 6A and 6B are YZ cross-sectional views when the plug member is opened and closed according to the first exemplary embodiment.
Figure 6B:
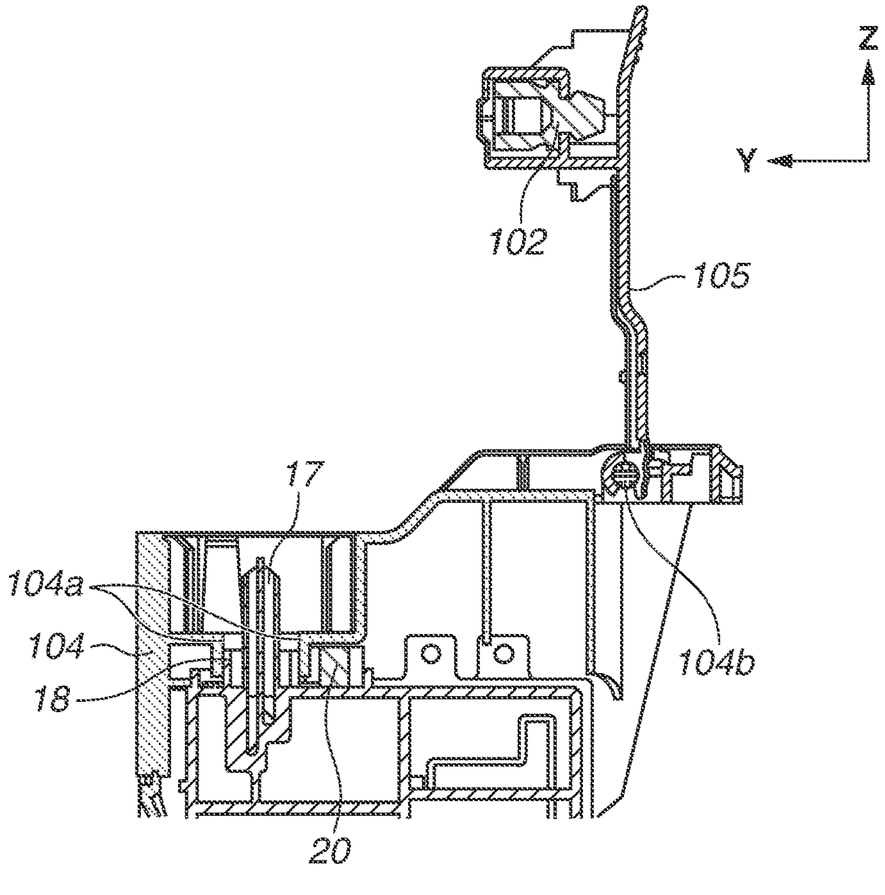

FIGS. 5A and 5B are perspective views illustrating how the plug member 102 is opened and closed, and FIGS. 6A and 6B are YZ cross-sectional views indicating how the plug member 102 is opened and closed. The plug member 102 is a member movable to the open position, at which the plug member 102 opens the ink injection port 17, and the close position, at which the plug member 102 closes the ink injection port 17, as described above. The plug member 102 is held on a holding member 105, and, further, the holding member 105 is supported pivotally by a pivotal shaft 104*b* provided to a housing 104. Due to this configuration, the holding member 105 is positioned relative to the housing 104, and is pivotal to an open position, at which the holding member 105 opens the ink injection port 17, and a close position, at which the holding member 105 closes the ink injection port 17.

The position of the housing 104 relative to the ink tank 6 is fixed due to fitting between a rib 18 provided on the ink tank 6, which will be described below, and a fitting portion 104*a*.

Figure 7A:
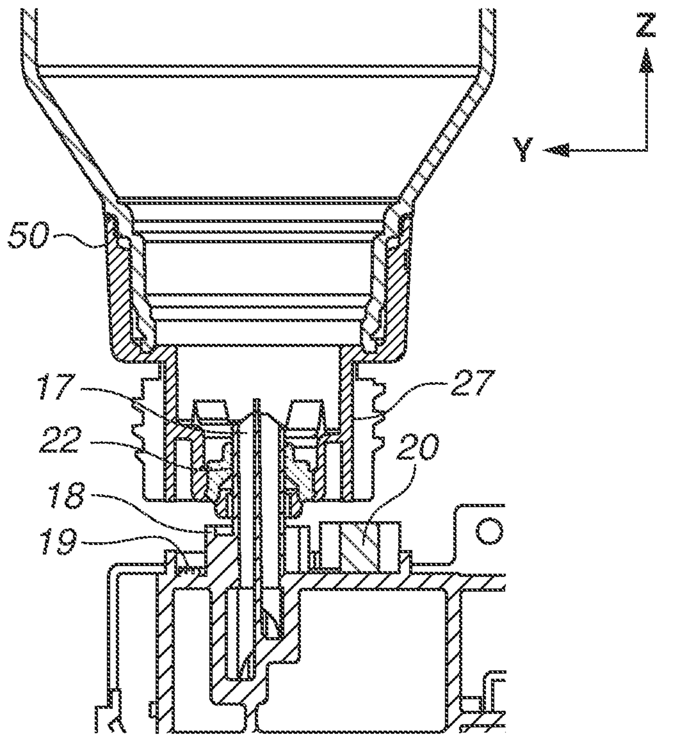
FIGS. 7A and 7B are YZ cross-sectional views when an ink injection container is inserted into and extracted from the ink tank according to the first exemplary embodiment.
Figure 7B:
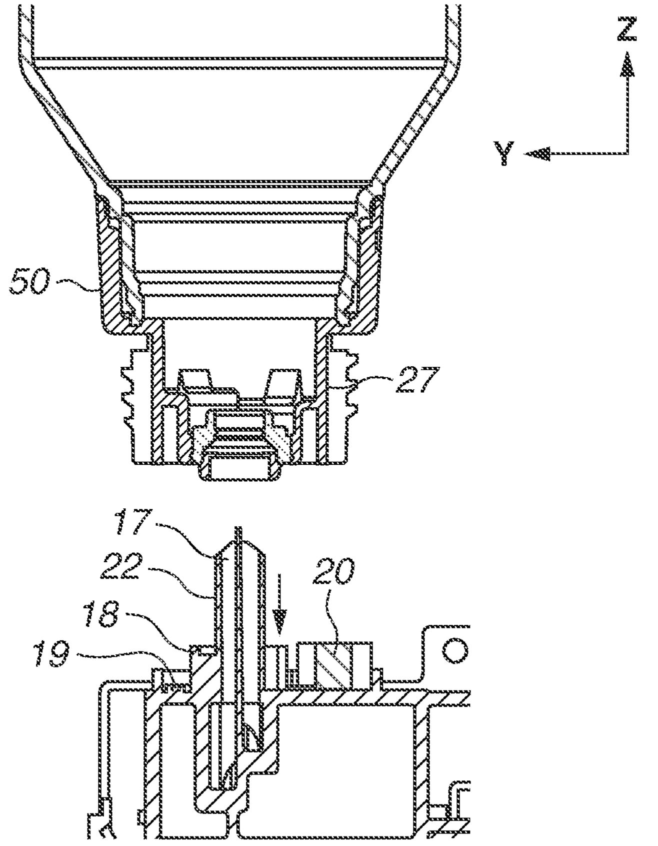

FIGS. 7A and 7B are YZ cross-sectional views when an ink injection container is inserted into and extracted out of the ink tank 6. The ink injection port 17 of the ink tank 6 is configured to allow an ink injection container 50, which is a liquid injection container, to be inserted into it in a substantially Z direction intersecting with the X and Y directions. When injecting the ink from the ink injection container 50 into the ink tank 6, the user inserts the ink injection container 50 into the ink injection port 17 as illustrated in FIG. 7A and injects the ink from the ink injection container 50 into the ink tank 6.

After completing the injection of the ink from the ink injection container 50 into the ink tank 6, the user pulls out the ink injection container 50 from the ink injection port 17 as illustrated in FIG. 7B.

Figure 8A:
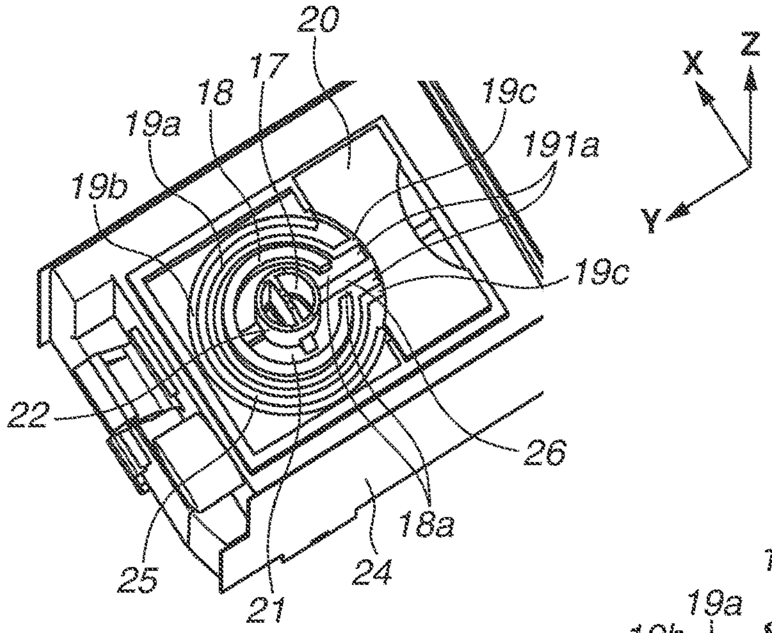
FIGS. 8A to 8C are perspective enlarged views of the vicinity of an ink injection port on the ink tank according to the first exemplary embodiment.
Figure 8B:
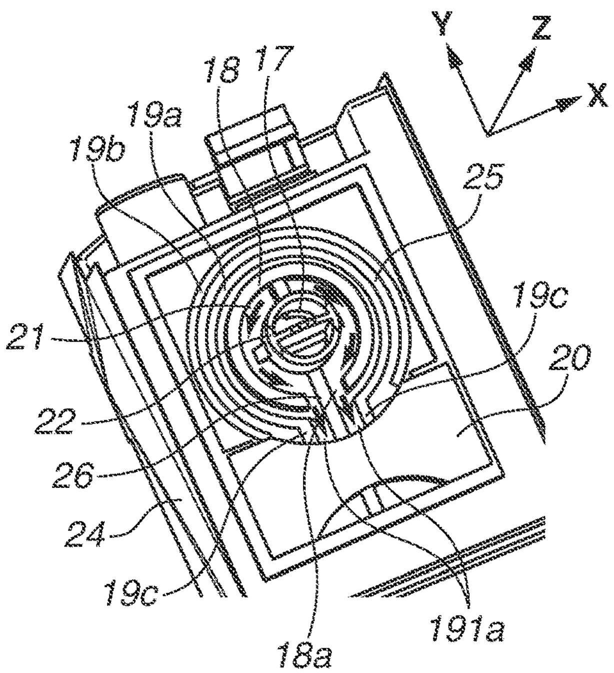
Figure 8C:
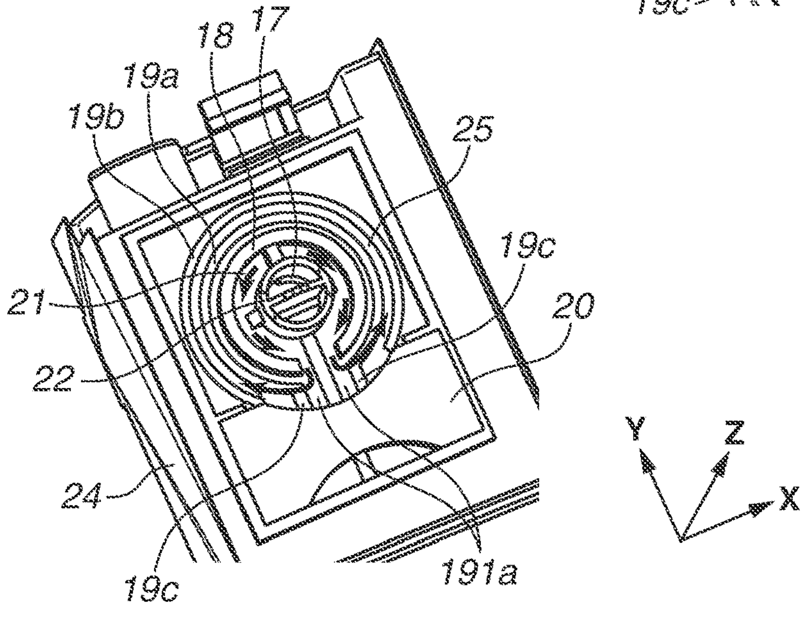

FIGS. 8A to 8C are perspective enlarged views of the vicinity of the ink injection port 17 on the ink tank 6. When the ink is injected from the ink injection container 50 into the ink tank 6, the ink may be spilled out from the ink injection container 50 or the ink injection port 17 and the side surface of the ink tank 6 may be contaminated with the ink. Especially, when the spilled ink is attached to the visual confirmation surface 16 of the ink tank 6, the attached ink impedes the user's visual conformation of the ink amount in the ink tank 6. Further, when, for example, the recording apparatus 1 is subjected to an impact or the orientation of the recording apparatus 1 is changed with the ink spilled on the side surface of the ink tank 6, the ink may be scattered and attached to a component placed around the ink tank 6 and the user's hand may become dirty by touching it. With the aim of preventing the ink from being attached to the visual conformation surface 16 of the ink tank 6 or a component placed around it in this manner, some measure should be taken to prevent the ink spilled out from the ink injection port 17 or the ink injection container 50 from spreading.

An ink holding member 20 formed using an absorber capable of absorbing the liquid is disposed near the ink injection port 17 of the ink tank 6 according to the present exemplary embodiment as illustrated in FIG. 6A. Further, ribs 18, 19*a*, and 19*b*, which are circular arc-shaped protrusion portions, are provided around the ink injection port 17. Further, a rib 26, which is a linear protrusion portion extending from the ink injection port 17 toward the ink holding member 20, is provided around the ink injection port 17. The rib 18 has a circular arc shape with an opening portion 18*a* provided at a portion thereof that faces the ink holding member 20.

The ribs 19*a* and 19*b* are configured to be lower in height in the Z direction than the rib 18, and the rib 19*a* is provided with an opening portion 191*a* similarly to the opening portion 18*a* of the above-described rib 18. Further, the rib 19*a* is connected to a rib 19*c*, which extends from the opening portion 191*a* in a direction toward the ink holding member 20. Further, the rib 19*b* also has a circular arc shape opened at a portion thereof that faces the ink holding member 20. The ribs 19*a* and 19*b*, and the above-described rib 26 are in contact with the ink holding member 20. The ribs are formed around the ink injection port 17 in this manner, thereby forming an ink guide path 21, which is a liquid guide portion, and an ink holding path 25. Desirably, the heights of the ribs 19*a*, 19*b*, and 19*c* are heights that not impede the fitting with the rib 18 and the fitting portion 104*a*.

A flow of the ink introduced in the ink guide path 21 will be described with reference to FIG. 8B. After injecting the ink into the ink tank 6, the user pulls out the ink injection container 50 from the ink injection port 17 as illustrated in FIG. 7B, but the ink may be attached to an outer surface 22 of the ink injection port 17 at this time. The ink attached to the outer surface 22 of the ink injection port 17 is directly dropped downward according to the force of gravity. The dropped ink enters the ink guide path 21. Then, as the amount of the ink flowing into the ink guide path 21 is increasing, the ink flows along the rib 18 and flows toward the opening portion 18*a* as indicated by arrows.

After reaching the opening portion 18*a*, the ink is further moved along the rib 26. When reaching the ink holding member 20, the ink is absorbed and held in the ink holding member 20. At this time, the ink is prevented from spreading in the X direction due to the rib 19*c*, and is reliably guided to the ink holding member 20. As a result, the ink can be moved from the ink injection port side (the liquid injection portion side) to the ink holding member 20.

If the ink overflows from the ink guide path 21, the ink overflowing over the rib 18 is introduced into the ink holding path 25 as indicated by arrows in FIG. 8C, and the introduced ink is held with the aid of a capillary force. The ink held in the ink holding path 25 is dried as time passes. Therefore, even if the ink overflows from the ink guide path 21 again, the ink is held in the ink holding path 25 and is prevented from spreading to the outer side with respect to the ink holding path 25. In this manner, in the ink tank 6, the ink holding member 20 and the ink holding path 25 function as a liquid holding unit and prevent the ink from spreading.

Due to this configuration, the ink attached to the outer surface 22 of the ink injection port 17 is guided to the ink holding member 20 by the ink guide path 21 and is held therein. Further, even if the ink overflows from the ink guide path 21, the ink is held in the ink holding path 25. As a result, the present configuration can prevent the spilled ink from spreading and further allow the ink to be held by the ink holding member 20, thereby also preventing the ink from being scattered when, for example, the orientation of the recording apparatus 1 is changed. Further, the present configuration allows the volume of the ink holding member 20 to reduce by an amount equivalent to the volume of the ink that can be held in the ink holding path 25, thereby achieving a reduction in the size of the ink holding member 20.

Two or more ink holding paths 25 may be provided by further forming a rib on the outer side with respect to the ribs 19*a* and 19*b*. Further, in the present exemplary embodiment, the ink tank 6 is configured to be able to also hold the ink in a space between the rib 19*a* and the rib 18, thereby being able to hold the ink overflowing from the ink guide path 21 even when only the rib 19*a* is provided without the rib 19*b* provided. However, increasing the number of ink holding paths 25 allows the ink tank 6 to hold the ink by a further larger amount compared to the state illustrated in FIGS. 8A to 8C, in which the ink tank 6 includes one ink holding path 25. This allows the ink tank 6 to deal with even an increase in the amount of the ink overflowing from the ink guide path 21, thereby being able to enhance the effect of preventing the ink from spreading compared to when the ink tank 6 includes one ink holding path 25.

Figure 9A:
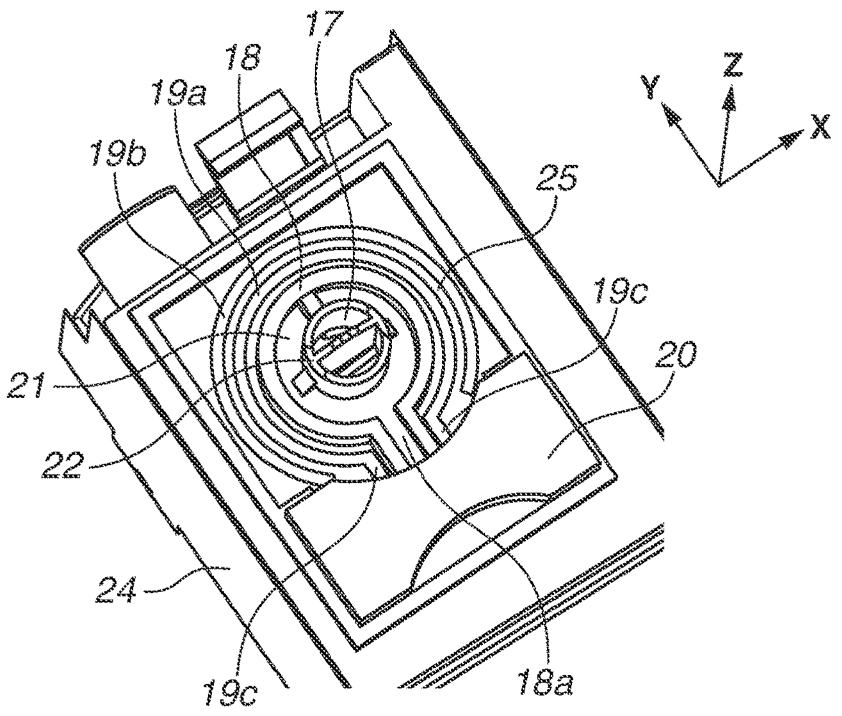
FIGS. 9A and 9B are perspectives enlarged views when the ink tank according to the first exemplary embodiment is configured in another manner.

The rib 18 may have an extended shape in such a manner that the opening portion 18*a* is in contact with the ink holding member 20 as illustrated in FIG. 9A. This allows the ink to be guided from the ink guide path 21 to the ink holding member 20 even with the rib 26 illustrated in FIGS. 8A to 8C omitted.

Figure 9B:
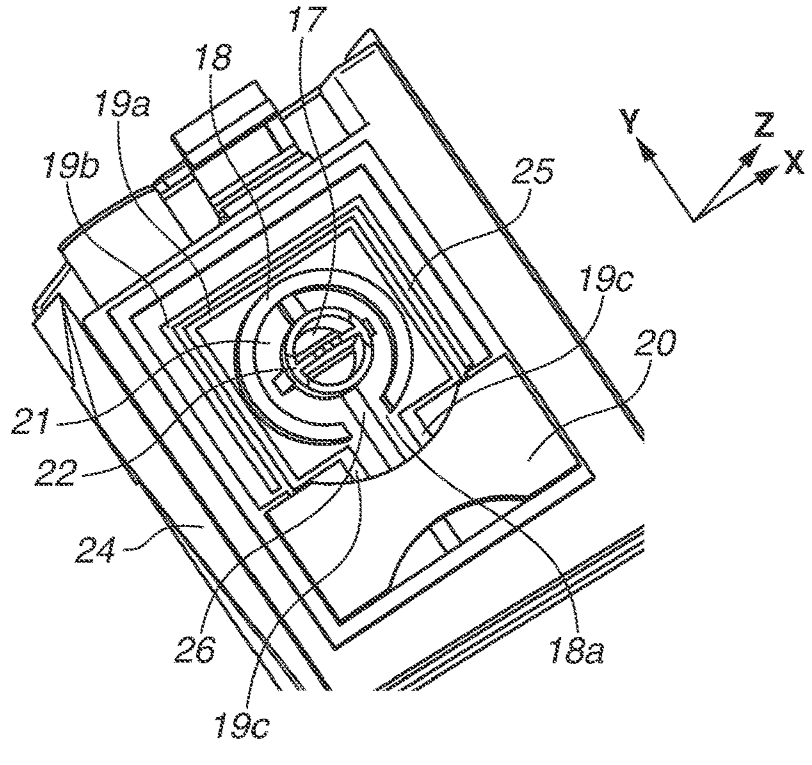

Further, in the present exemplary embodiment, the ink tank 6 is structured in such a manner that the rib 19*a* and the rib 19*b* provided around the rib 18 are formed in a circular arc shape, by which the ink holding path 25 is located near the rib 18 and the ink overflowing from the ink guide path 21 is quickly introduced into the ink holding path 25. However, the shape of the ink holding path 25 does not have to be the circular arc shape, and the ink holding path 25 can hold the ink overflowing from the ink guide path 21 as long as it has a shape surrounding the rib 18 outside it. For example, the ink holding path 25 may be formed by quadrilaterally providing the ribs 19*a* and 19*b* as illustrated in FIG. 9B, or may be formed in a shape other than the quadrilateral shape.

In the following description, a second exemplary embodiment will be descried, but will be described omitting the description of a configuration similar to that of the first exemplary embodiment.

Figure 10:
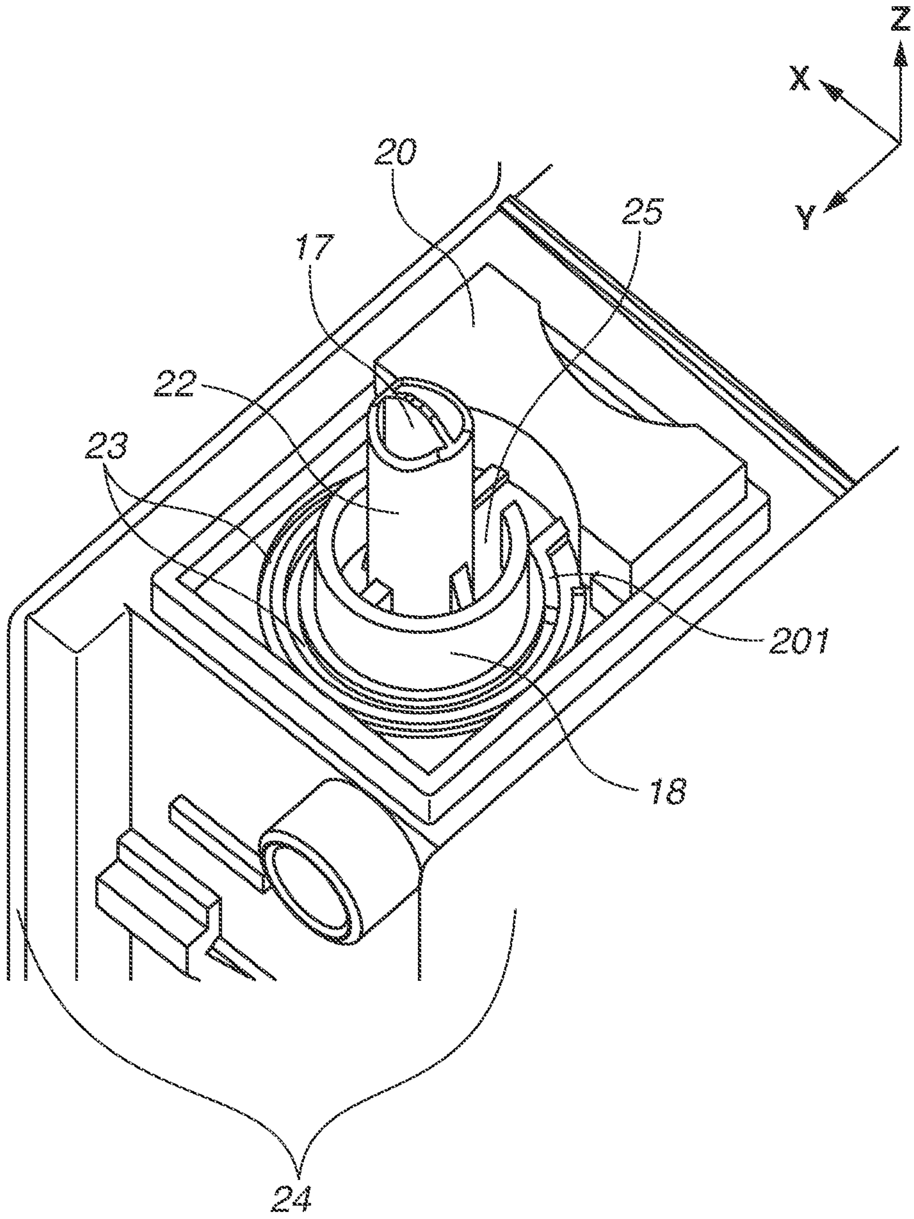
FIG. 10 is a perspective enlarged view of the vicinity of an ink injection port of an ink tank according to a second exemplary embodiment.
Figure 11:
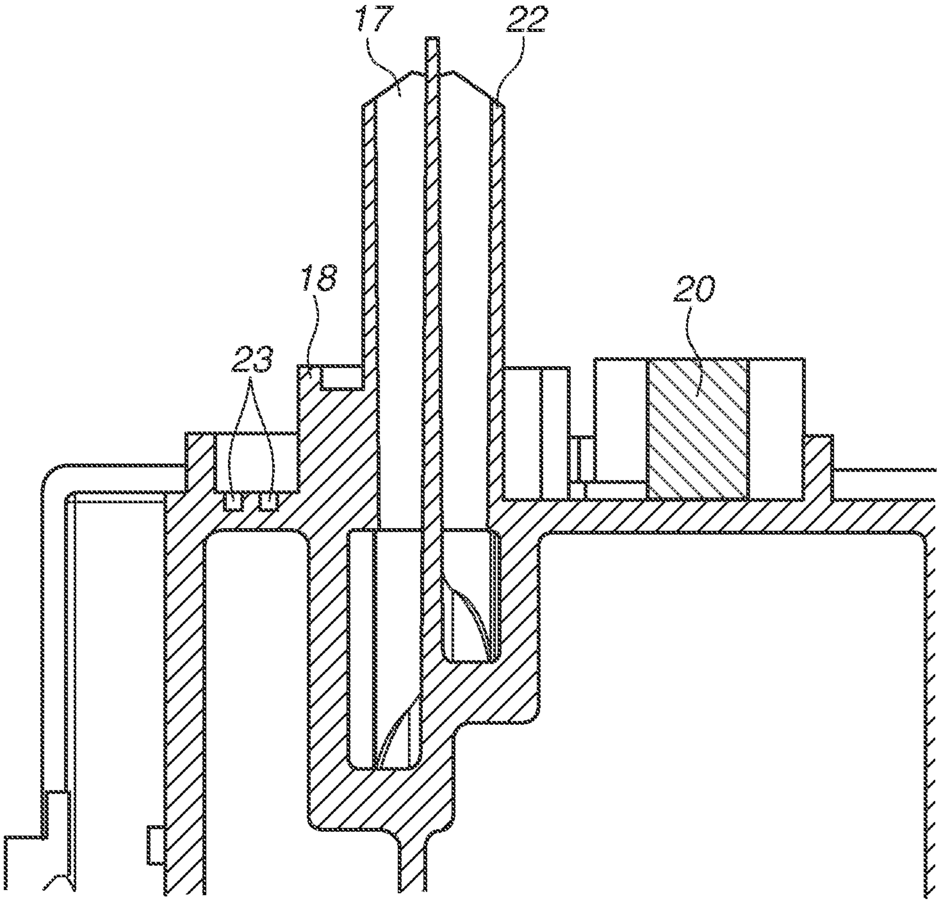
FIG. 11 is an enlarged cross-sectional view of the ink tank according to the second exemplary embodiment that is taken along a YZ plane containing the ink injection port.

FIG. 10 is a perspective enlarged view of the vicinity of the ink injection port 17 of the ink tank 6 according to the present exemplary embodiment, and FIG. 11 is an enlarged cross-sectional view of the ink tank 6 taken along the YZ plane containing the ink injection port 17. In the present exemplary embodiment, circular arc-shaped groove portions 23 are provided around the rib 18. A rib 201 extending to the ink holding member 20 is provided near the openings of the groove portions 23, and the ink guided to the opening portion 18*a* by the ink guide path 21 is further guided to the ink holding member 20 by the rib 201. When the ink guided to the ink holding member 20 by the rib 201 reaches the ink holding member 20, the ink is absorbed and held in the ink holding member 20.

Further, if the ink overflows from the ink guide path 21 in the present exemplary embodiment similarly to the first exemplary embodiment, the overflowing ink is introduced into the groove portions 23 and the ink is held in the groove portions 23 with the aid of a capillary force. Due to this configuration, the ink introduced into the ink guide path 21 is guided to the ink holding member 20 or the ink holding path 25 and is held therein, and therefore the ink can be prevented from spreading into a wide range.

The ink tank 6 is configured in such a manner that two groove portions 23 are provided in the present exemplary embodiment, but the number of groove portions 23 may be two or more or may be one. An increase in the number of groove portions 23 leads to an increase in the amount of the ink that can be held in the groove portions 23, thereby allowing the ink tank 6 to deal with even an increase in the amount of the ink overflowing from the ink guide path 21. Further, the present configuration allows the volume of the ink holding member 20 to reduce by an amount equivalent to the volume of the ink that can be held in the groove portions 23, thereby achieving a reduction in the size of the ink holding member 20.

Further, in the present exemplary embodiment, the rib 18 may have an extended shape in such a manner that the opening portion 18*a* is in contact with the ink holding member 20 similarly to the first exemplary embodiment. Further, the shape of the groove portion 23 may be any shape that can surround the rib 18 without being limited to the circular arc shape, and the groove portion 23 may be formed in a quadrilateral shape or another shape.

In the following description, a third exemplary embodiment will be described, but will be described omitting the description of a configuration similar to that of the first exemplary embodiment or the second exemplary embodiment.

Figure 12A:
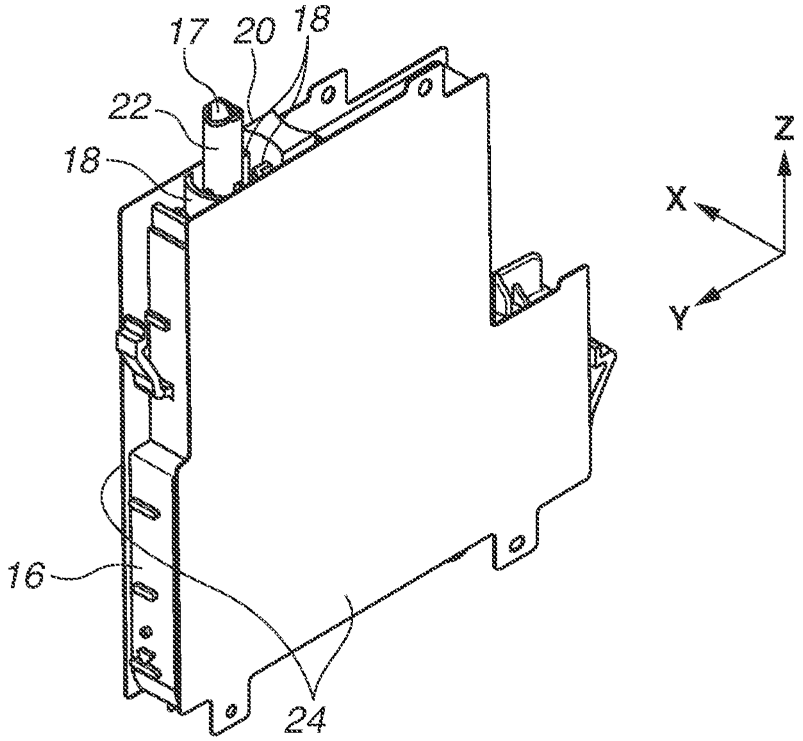
FIGS. 12A and 12B are perspective views of an ink tank according to a third exemplary embodiment.
Figure 12B:
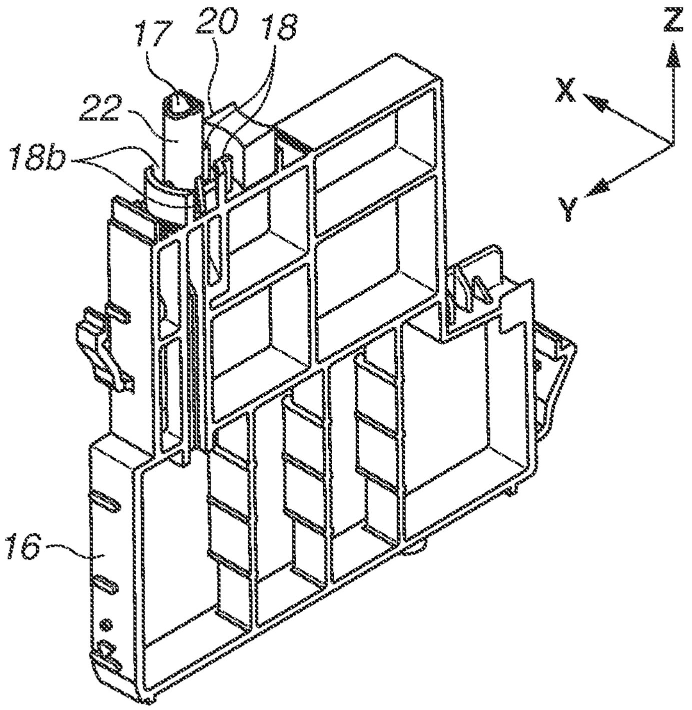
Figure 13:
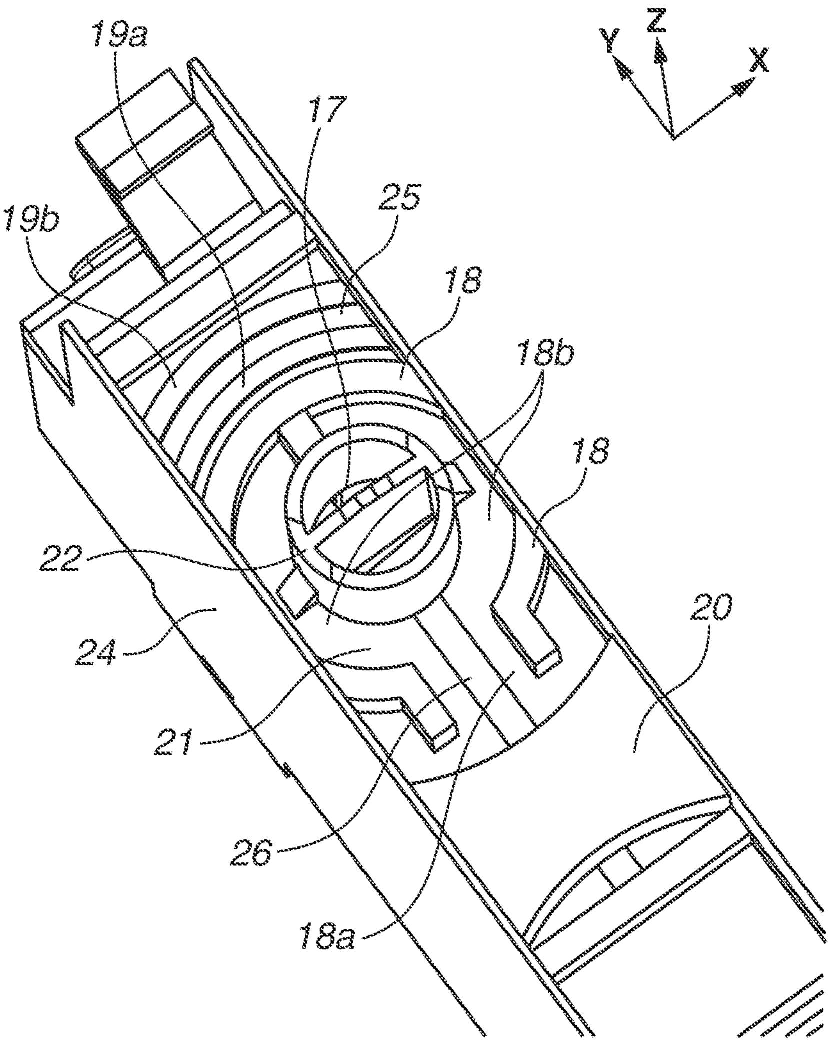
FIG. 13 is a perspective enlarged view of the ink tank according to the third exemplary embodiment.

FIGS. 12A and 12B are perspective views of the ink tank 6 according to the present exemplary embodiment, and FIG. 13 is a perspective enlarged view of the vicinity of the ink injection port 17 on the ink tank 6. FIG. 12A is an external perspective view of the ink tank 6, and FIG. 12B is a perspective view with the film 24 not welded to the ink tank 6. In the present exemplary embodiment, the rib 18 includes an opening portion 18*b* in the X direction, and the opening portion 18*a* at the portion thereof that faces the ink holding member 20. The film 24 is welded to the end portion of the rib 18 forming the opening portion 18*b*, thereby bringing the opening portion 18*b* into a closed state. As a result, the ink guide path 21 is formed by the rib 18 and the film 24.

In a case where the ink tank 6 is not configured in such a manner that the ink chamber is formed by welding a thin sheet like a film, the ink guide path 21 may be constructed by gluing a member forming the side surface of the ink tank 6 and the opening portion 18*b*. In other words, the ink guide path 21 can be constructed by gluing or welding a part of any member forming the side surface of the ink tank 6 to the opening portion 18*b*.

In this manner, the ink guide path 21 can also be constructed even when the ink tank 6 is not configured in such a manner that the portion of the rib 18 other than the opening portion 18*a* continuously surrounds the ink injection port 17 therearound. The ink introduced into the ink guide path 21 is guided to the ink holding member 20 by the rib 18 and the rib 26 similarly to the first exemplary embodiment, and is absorbed and held in the ink holding member 20.

In the present exemplary embodiment, the film 24 is also welded to the end portions of the rib 19*a* and the rib 19*b* formed on the outer side with respect to the rib 18 in the X direction, and the ink holding path 25 is formed by the ribs 19*a* and 19*b*, and the film 24. Even when the ink introduced into the ink guide path 21 overflows in the +Y direction, the ink is introduced into the ink holding path 25 and held therein.

Due to this configuration, the ink introduced into the ink guide path 21 is guided to the ink holding member 20 or the ink holding path 25 and is held therein, and therefore the ink can be prevented from spreading into a wide range. Further, the present configuration allows the ink tank 6 to reduce in width in the X direction compared to when the ink injection port 17 is surrounded by the rib 18 along the entire circumference thereof.

Further, in the present exemplary embodiment, the rib 18 may also have an extended shape in such a manner that the opening portion 18*a* is in contact with the ink holding member 20 similarly to the first exemplary embodiment and the second exemplary embodiment.

In the present exemplary embodiment, the reduction in the width of the ink tank 6 in the X direction leads to a reduction in the dimension of the ink holding member 20 in the X direction, but the absorption capacity can be maintained by increasing the thickness of the ink holding member 20 in the Z direction.

Figure 14:
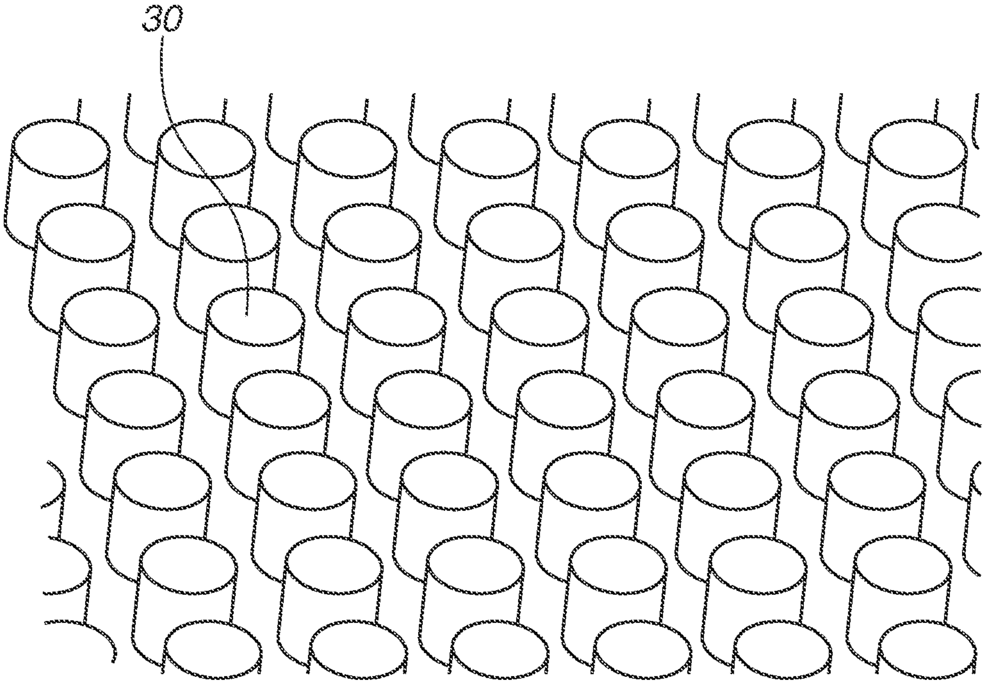
FIG. 14 is a schematic view of a microfabricated surface according to the first exemplary embodiment to the third exemplary embodiment.

The surface of the ink guide path 21 in any of the exemplary embodiments may have a microstructured uneven shape formed by providing a plurality of columns 30 several 10 μm in each of diameter, height, and pitch as illustrated in FIG. 14. Forming the microstructured uneven shape on the surface of the ink guide path 21 can improve the wettability of the surface with the aid of a capillary force derived from the uneven shape, thereby further facilitating guiding the ink. Further, in a case where a microstructured uneven shape is formed on the inner side of the rib 18 (the inner side that faces the outer surface 22 of the ink supply port 17), the capillary force also facilitates the movement of the ink attached to the rib 18 along the ink guide path 21. Further, the ink guide path 21 may also be inclined downward as it extends toward the ink holding member 20, thereby facilitating guiding the ink to the ink holding member 20.

In any of the exemplary embodiments, the ink holding member 20 is disposed at a position spaced apart from the ink injection port 17, and therefore the ink holding member 20 can be simply shaped. For example, in a case where the ink holding member 20 is disposed so as to surround the ink injection port 17, the ink holding member 20 should be disposed around the ink injection port 17 in a shape avoiding the ink injection port 17, and therefore may have a complicated shape. On the other hand, the configurations according to the first exemplary embodiment to the third exemplary embodiment can be constructed just by disposing the ink holding member 20 in a direction in which the ink is guided by the ink guide path 21, thereby eliminating the necessity of disposing the ink holding member 20 so as to surround the ink injection port 17 therearound. This makes the shape of the ink holding member 20 free of the influence of the shape of the ink injection port 17, thereby allowing the ink holding member 20 to be formed with a simple shape such as a rectangle.

In any of the exemplary embodiments, the side surface of the ink holding member 20 in the Y direction has an inward recessed shape. This can prevent interference between the fitting portion 104*a* and the ink holding member 20 when the housing 104 and the ink tank 6 are fitted as illustrated in FIGS. 6A and 6B, thereby allowing the housing 104 and the ink tank 6 to be smoothly fitted to each other.

Further, the ink holding member 20 according to the present exemplary embodiments can prevent the occurrence of interference with the fitting portion 104*a* due to a difference in the layout orientation of the ink holding member 20 by being shaped symmetrically with respect to the X axis with recesses provided on both of the side surfaces thereof in the Y direction. However, the provision of the recess of the ink holding member 20 is not limited to this example as long as the recess of the ink holding member 20 is provided at the portion fitted with the fitting portion 104*a*, and the recess of the ink holding member 20 does not have to be provided on both of the side surfaces in the Y direction.

Further, in any of the exemplary embodiments, the opening portion 18*a* of the rib 18 and the opening portion 191*a* of the rib 19 do not have to be located on the deep side in the Y direction with respect to the ink injection port 17. For example, the ink tank 6 may be configured in such a manner that each of the opening portions of the ribs is provided on the front side in the Y direction with respect to the ink injection port 17, or may be configured in such a manner that each of the opening portions of the ribs is provided on another side. In this case, the exemplary embodiments can be realized as long as the ink tank 6 is configured in such a manner that the ink holding member 20 is disposed at a position that faces the opening portions 18*a* and 191*a* and the ink is guided to the ink holding member 20 by the ink guide path 21.

According to the present disclosure, it is possible to prevent the liquid from spreading to the vicinity of the liquid storage container.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-201109, filed Dec. 10, 2021, which is hereby incorporated by reference herein in its entirety.

What is claimed is:

1. A liquid discharge apparatus comprising:

a liquid discharge head configured to discharge liquid to a medium; and a liquid storage container including:

a reservoir portion configured to reserve the liquid that is supplied to the liquid discharge head, a liquid injection portion configured to allow a liquid injection container for injecting the liquid into the reservoir portion to be inserted in the liquid injection portion in a first direction, a liquid holding unit provided at a position spaced apart from the liquid injection portion and capable of holding the liquid, and a liquid guide portion configured to guide the liquid from the liquid injection portion to the liquid holding unit in a second direction intersecting with the first direction, wherein the liquid guide portion includes a first protrusion portion provided so as to surround an outer surface of the liquid injection portion, wherein the first protrusion portion includes a first opening portion on at least a part of a portion that faces the liquid holding unit in the second direction, wherein the liquid holding unit includes a first liquid holding unit and a second holding unit, wherein the first liquid holding unit is formed using an absorber capable of absorbing the liquid and provided at a position that faces the first opening portion of the liquid guide portion, and wherein the second liquid holding unit is provided so as to surround the liquid guide portion therearound and includes a second opening portion on at least a part of a portion that faces the first opening portion of the liquid guide portion.

2. The liquid discharge apparatus according to claim 1, wherein the liquid guide portion includes the outer surface of the liquid injection portion.

3. The liquid discharge apparatus according to claim 1, wherein the liquid storage container includes a second protrusion portion extending from the liquid injection portion toward the liquid holding unit via the first opening portion, and the liquid guide portion includes the second protrusion portion.

4. The liquid discharge apparatus according to claim 1, wherein the second opening portion is in contact with the first liquid holding unit.

5. The liquid discharge apparatus according to claim 1, wherein the second liquid holding unit includes a protrusion portion provided in a shape surrounding the liquid guide portion.

6. The liquid discharge apparatus according to claim 1, wherein the second liquid holding unit includes a groove portion provided in a shape surrounding the liquid guide portion.

7. The liquid discharge apparatus according to claim 1, wherein the liquid guide portion includes the first protrusion portion and a part of a side surface forming the reservoir portion.

8. The liquid discharge apparatus according to claim 7, wherein at least one side surface of the reservoir portion is formed with a film, and wherein the part of the side surface forming the reservoir portion that is included in the liquid guide portion is the at least one side surface formed with the film.

9. The liquid discharge apparatus according to claim 1, wherein the liquid guide portion includes a surface having a microstructured uneven shape.

10. The liquid discharge apparatus according to claim 1, wherein the liquid is ink containing a color material, and the liquid discharge head is a recording head configured to record an image onto the medium on which the liquid is discharged.

11. A liquid storage container comprising:

a reservoir portion configured to reserve liquid that is supplied to a liquid discharge head configured to discharge the liquid onto a medium;

a liquid injection portion configured to allow a liquid injection container for injecting the liquid into the reservoir portion to be inserted in the liquid injection portion in a first direction;

a liquid holding unit provided at a position spaced apart from the liquid injection portion and capable of holding the liquid; and a liquid guide portion configured to guide the liquid from a liquid injection portion side to the liquid holding unit in a second direction intersecting with the first direction, wherein the liquid guide portion includes a first protrusion portion provided so as to surround an outer surface of the liquid injection portion, wherein the first protrusion includes a first opening portion on at least a part of a portion that faces the liquid holding unit in the second direction, wherein the liquid holding unit includes a first liquid holding unit and a second liquid holding unit, wherein the first liquid holding unit is formed using an absorber capable of absorbing the liquid and provided at a position that faces the first opening portion of the liquid guide portion in the second direction, and wherein the second holding unit is provided so as to surround the liquid guide portion therearound and includes a second opening portion on at least a part of a portion that faces the first opening portion of the liquid guide portion.

* * * * *